United States Patent
Olaf et al.

[15] 3,651,506
[45] Mar. 21, 1972

[54] CONVEYOR BAND MONITORING APPARATUS

[72] Inventors: Jorn Olaf, Essen; Walter Ratz, Gelsenkirchen, both of Germany

[73] Assignee: Bergwerksverband GmbH, Essen, Germany

[22] Filed: Sept. 30, 1969

[21] Appl. No.: 862,253

[52] U.S. Cl. ........................340/259, 340/258 C, 198/232
[51] Int. Cl. .............................................G08b 21/00
[58] Field of Search..............340/258, 258 L, 259; 198/232; 324/34, 41

[56] References Cited

UNITED STATES PATENTS

| | | |
|---|---|---|
| 2,203,508 | 6/1940 | Rosenthal....................198/232 |
| 2,774,060 | 12/1956 | Thompson....................340/258 |
| Re25,215 | 8/1962 | James....................198/232 |
| 3,055,481 | 9/1962 | Austin....................340/259 UX |
| 3,058,059 | 10/1962 | Bockenmuehl....................340/258 UX |
| 3,176,241 | 3/1965 | Hogan et al....................324/41 X |

Primary Examiner—John W. Caldwell
Assistant Examiner—Michael Slobasky
Attorney—Michael S. Striker

[57] ABSTRACT

Conductive loops uniformly spaced along the conveyor band complete the signal transmission path between a high frequency transmitter and receiver at uniformly spaced time instants. Damage of conveyor band damages loop, interrupting signal path and consequent interruption of signal from receiver causes stopping of band.

9 Claims, 9 Drawing Figures

INVENTORS:
JORN OLAF
WALTER RÄTZ

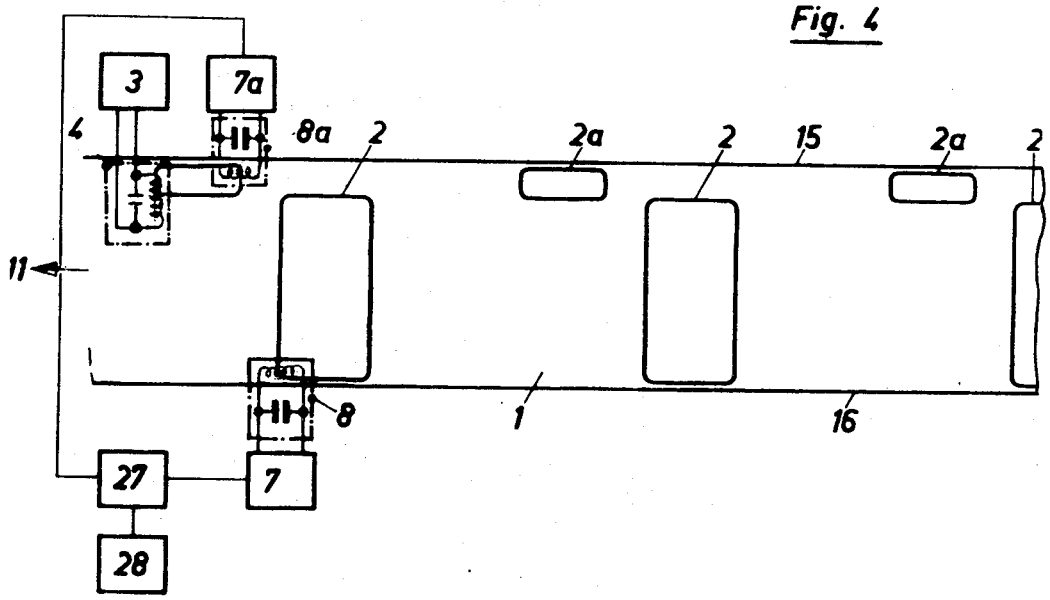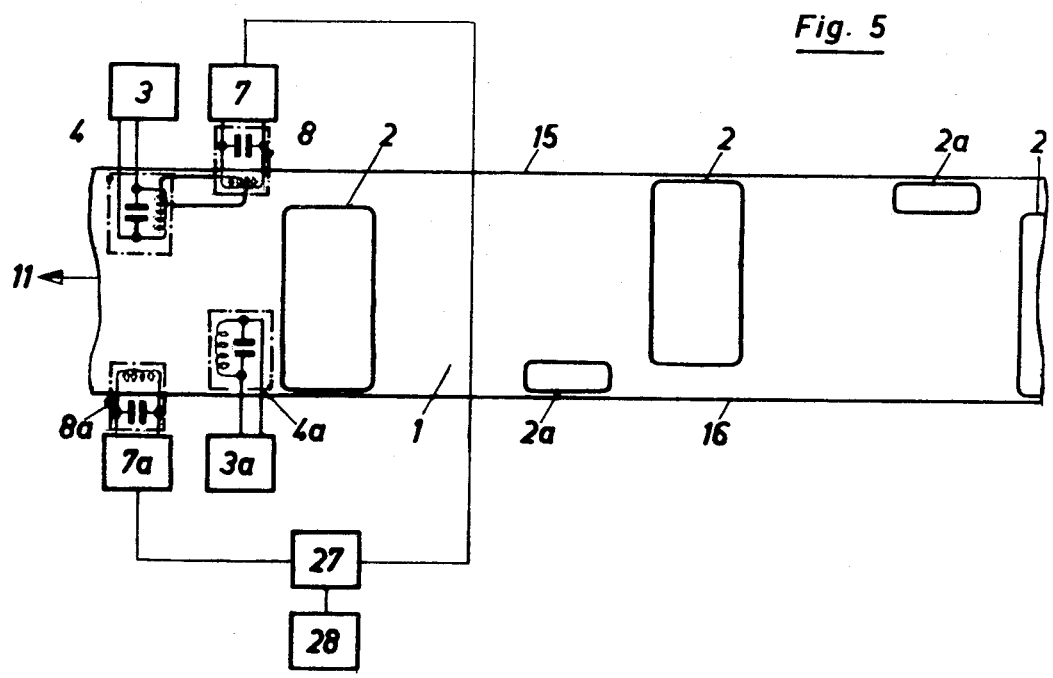

CONVEYOR BAND MONITORING APPARATUS

BACKGROUND OF THE INVENTION

The present invention resides in an arrangement for monitoring conveyor bands, through which mechanical damage and/or thermal overheating results in damage to the conveyor band become early recognized.

In a conventional monitoring arrangement known in the art for conveyor bands, closed conductive loops cover the entire width of the band. Stationary receiver units reside outside or exterior to the band. Each conductive loop is provided with a voltage source and a transmitter energized by the source. The transmitter influences the receiver with a frequency which differs from that of the current flowing in the loop. This conventional arrangement, however, is very complex and requires considerable equipment. When a conductive loop is ripped or torn, the excitation of the receiver is discontinued. In this manner the reporting of the damage results through the omission of a continuous signal, and this condition is also of disadvantage.

Accordingly, it is an object of the present invention to provide an arrangement which does not possess the foregoing disadvantages and which, on the other hand, provides substantial advantages, from the viewpoint of simplicity, for the production of monitored conveyor bands.

This object of the present invention is achieved by providing conductive loops within or on the conveyor band. A frequency transmitter and receiver are arranged exterior to the conveyor band and operatively coupled through the conductive loops. Both of the transmitter and receiver are driven through a common frequency in their antenna circuits. The receiver emits its output signal to an analyzing unit which is connected with the control circuit of the driving motor for the conveyor band and/or a warning device. High frequency transmitters and receivers are preferably arranged within the region of both conveyor band edges. It is also possible to provide also further high frequency transmitters and receivers longitudinally along the conveyor band.

In the use of the present invention, the closed conductive loops in or on the conveyor band and referred to hereinafter as monitoring loops, serve the purpose of transmitting electromagnetically the electrical energy between a transmitter and a receiver located at different sections of the monitoring loop.

During proper operation of the conveyor band, the transmission of electrical energy takes place when a monitoring loop arrives within the operational region of the antenna circuits with their coils. Should a monitoring loop be damaged through mechanical or thermal effects, the transmission of the energy does not take place. The high frequency transmitter operates at a line frequency which is above the alternating current frequency, and has, moreover, a power output which is below 2 watts. The antenna circuit for the receiver can be tuned to the frequency of the transmitter, but it can also be operated in an untuned manner.

In order to prevent a direct coupling between the inductances of the transmitter and receiver antennas, when narrow conveyor bands are used, the magnetic axes of the transmitter and receiver coils of the antenna circuits, are arranged perpendicular or normal to each other. In this manner, the transmitter and receiver coils are simultaneously operatively coupled through a monitoring loop and, at the same time, both inductances assume a neutral state with respect to the other.

For the purpose of overcoming difficulties from the viewpoint of spatial requirements, it is also possible to arrange both transmitter and receiver coils in direct proximity on one side of the conveyor band to be monitored.

In order to detect at an early time any damage of a monitoring loop, it is desirable to arrange the monitoring loops in a uniformly spaced manner within or on the conveyor band. Such spacing of the loops can be of the order of 20 to 50 meters, depending on the precision desired for monitoring purposes. When the operation of the conveyor band is thereby, free from disturbances, signal transmission from the transmitter to the receiver, by way of the monitoring loops, takes place in a corresponding rhythm or frequency. When one or more pulses are omitted because of damaged monitoring loops, the rhythm of the pulse train is made non-uniform, and as a consequence, the conveyor band may be stopped from operating through the analyzing unit which, for example, may in the form of a delay relay which opens the circuit to the motor for driving the conveyor band.

The pulse train becomes also non-uniform when the conveyor band slips on the driving roller as a result of humidity or moisture, or low voltage. When these conditions prevail, danger prevails from the viewpoint of burning of the conveyor band as a result of overheating. Through the application of the present invention, therefore, it is possible to avoid or omit costly monitoring apparatus which is built for the purpose of detecting conveyor band slippage.

The monitoring loops possess, in general, the shape of a rectangular shaped section which is transversely arranged to the longitudinal running direction of a conveyor band. In place of such rectangular shaped section, however, other shapes are also possible in the form of an ellipse, a parallelogram, a trapezoid, a circle or any other similar shape which possesses a closed form or section.

In order to realize satisfactory monitoring of the edges of the conveyor bands with respect to damaging thereof, the monitoring loops extend as close as possible to the conveyor edges. The conductive loops have, for this purpose, T-shaped portions at the conveyor band edges, which are particularly adapted to achieve this result.

The monitoring loops can be made of metal or any other electrically conductive material as, for example, conductive rubber or cement. For the purpose of detecting at an early time damages to the conveyor bands at the upper surface thereof, it is desirable to arrange the monitoring loops on the conveyor bands or within the conveyor band and as close as possible to the band surface.

In the production of the conveyor bands with the monitoring loops, it is not always possible to precisely space the loops uniformly along the conveyor band. This condition also prevails when the monitoring loops are subsequently built into or built onto the conveyor band. For this reason, strict adherence to the uniformity in occurrence of the sampling pulses is not always justified. Such difficulty, on the other hand, is overcome through the present invention by providing an auxiliary loop located in front or next to each monitoring loop. The auxiliary loop is arranged on the conveyor belt so that it extends on the band for half its width. Through the use of a common electromagnetic high frequency transmitter and a high frequency receiver each, it is possible to monitor both the monitoring and the auxiliary loops. Thus, the proper operative state of the conveyor band is determined through the condition that the inductive coupling between the high frequency transmitter and receivers takes place through both loops. The signals received by the receiver units are applied to a comparator circuit and are analyzed so that when a difference in signals appears, because a loop is damaged or destroyed the analyzing unit causes the conveyor to be stopped.

In many cases it is desirable to detect at an early time the presence of double slits in a conveyor band. With double slits, the danger exists that the monitoring and auxiliary loops become damaged or destroyed simultaneously. In order to take into account this possible condition, a further design of the present invention provides for the arrangement of permanent magnets in the conveyor band. Such permanent magnets may, for example, be made to function in conjunction with a magnetic switch outside of the conveyor band. These permanent magnets serve as switching elements and serve the purpose of providing notice that a monitoring loop is oncoming, and for this reason they may replace the auxiliary loops and their associated high frequency receiver.

The provision of such switching elements in the form of preferably permanent magnets for issuing notice that monitoring loops are forthcoming has the particular advantage that the switching elements may be easily removed from the conveyor bands. Thus, even after a monitoring loop has been damaged or destroyed through, for example, a longitudinal slit, the operation of the conveyor band may be subsequently continued by removing the switching elements. Whereas such switching elements may be in the form of permanent magnets, they may also be in the form of radioactive, capacitive, galvanic, inductive or optical elements.

It has been found that when conveyor bands possess steel inserts, disturbances appear as a result of the condition that these steel inserts become magnetized. As a result, with such steel inserts in the conveyor band, it is no longer possible to use permanent magnets as described above for the operation of the monitoring arrangement. It has been found, however, that the use of permanent magnets may still be retained by using two or more permanent magnets of different polarity in front of each monitoring loop. In conjunction with these permanent magnets, a coil of approximately 15,000 to 25,000 turns with a ferromagnetic core, is arranged outside of the conveyor band. The coil has a pole arranged perpendicular to the running or operating direction of the conveyor band. A polarity dependent switching element as, for example, a Hall generator, may also be used for this purpose. The use of such an auxiliary arrangement resides in the condition that this predesigned polarity of the switching elements for which permanent magnets may be used, will hardly be duplicated through magnetization of the steel inserts.

The signals which result from the induction of voltages as a result of voltages as a result of the passage of the permanent magnets in the conveyor band past the polarity independent switching elements at the outside of the band, possess a predetermined polarity which is a function of the polarization direction of the magnetic field, in accordance with the laws of induction or induced voltages. By arranging two or more permanent magnets of different polarity, a predetermined code results as a consequence of the induced voltages. This code is formed and determined through the polarization direction itself and the number of magnets used. The signal code becomes analyzed in an electronic circuit which will respond only to a predetermined signal code. In this manner, the circuitry does not become affected through stray polarity effects. Thus, the code guarantees that magnetic effects stemming from metallic portions of the steel inserts in the conveyor band will produce no switching signal at the monitoring apparatus.

SUMMARY OF THE INVENTION

An arrangement for monitoring the proper operability of conveyor bands. Conductive loops in the form of conductive segments are arranged on the moving conveyor bands and travel therewith. External to the conveyor band, are high frequency transmitters and receivers which are coupled through the conductive loop segments. Whenever a conductive loop passes or intercepts the signal path between the stationary transmitter and receiver outside of the conveyor band, the transmission of energy between the transmitter and receiver is interrupted, and a signal is thereby produced. When a conductive segment or loop is damaged as a result of damage to the conveyor band, the occurrence of such a signal is omitted, and this omission of signals is detected in a signal analyzer which may be in the form of a comparator. The signal analyzer thereby disconnects the power from the motor which drives the conveyor band and holds the band stationary. The conductive loop segments or conductive slides are uniformly spaced along the conveyor band and may have T-shaped portions to protect the conveyor band edges. The uniform occurrence of signals as these conductive loop segments intercept a signal path between transmitter and receiver, registers the condition that the conveyor band is not damaged.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG 4 is a functional schematic diagram and shows another embodiment of the present invention in which the conductive elements on the conveyor bands are arranged in a predetermined layout;

FIG. 5 is a functional schematic diagram and shows a modification of the embodiment of FIG. 4;

DESCRIPTION OF THE PREFERRED EMBODIMENTS

Figure 1:
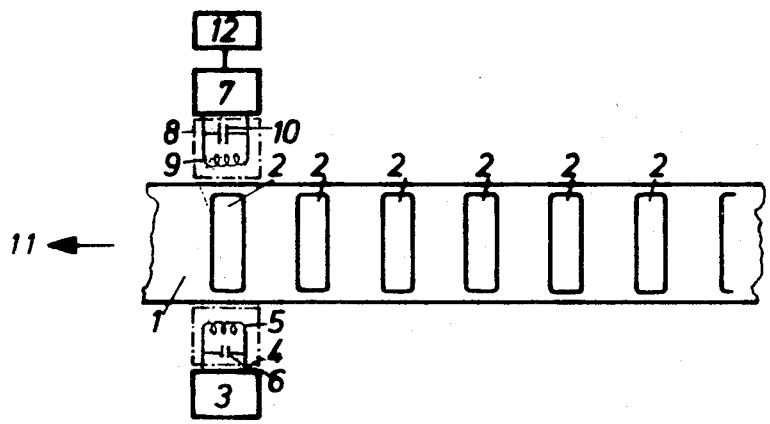
FIG. 1 is a functional schematic diagram of a portion of the conveyor band and the monitoring apparatus, in accordance with the present invention.

Referring to the drawing, and in particular to FIG. 1, a conveyor band 1 has monitoring loops 2 regularly or uniformly spaced from each other. A frequency generator 3 has an exterior antenna circuit 4 with an inductor 5 and capacitor 6 for transmitting inductively the energy of the generator to the conductive loops members 2. A receiver 7 located on the opposite side of a conveyor band and lying across from the transmitter 3, has an exterior antenna circuit 8 similar to this transmitter 3. Thus, the receiver 7 includes an inductance 9 and a capacitor 10. The receiver 7 receives through inductive coupling between the antenna circuit 8 and the conductive loops 2, the induced energy from the transmitter 3. When the conveyor band travels in the direction designated by the arrow 11 in the drawing, pulse-shaped signals are applied to the receiver 7 because of the uniform passage of the sliders 2 past the signal path. By applying the signals to a conventional delay stage 12, the conveyor may be immediately stopped when the pulse train becomes non-uniform because of slide tears or slippage of the conveyor band with respect to the driving roller.

Figure 2:
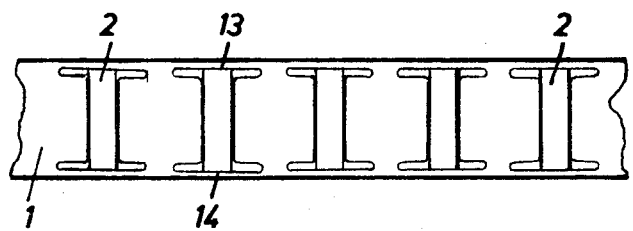
FIG. 2 is a plan view of a portion of the conveyor band and shows a particular shape of monitoring loops used in conjunction with the monitoring apparatus.

In accordance with the design of FIG. 2, the monitoring loops 2 possess T-shaped portions 13 and 14 at the edges of the conveyor band.

Figure 3A:
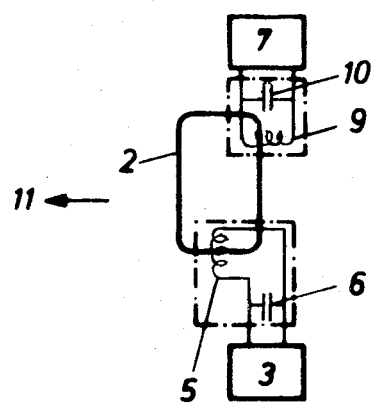
FIGS. 3a and 3b are functional schematic diagrams showing the interrelationship of high frequency transmitter and receiver used in the monitoring apparatus of FIG. 1, when the magnetic axes of the antenna circuits of the transmitter and receiver are arranged perpendicular to each other.
Figure 3B:
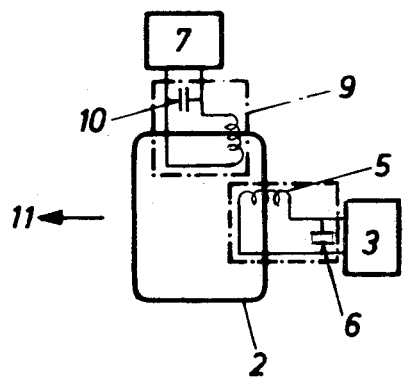

FIGS. 3a and 3b shows arrangements of the transmitter and receiver apparatus, where the magnetic axes of the antenna inductances are at right angles to each other. Such right-angle position has the advantage that even with narrow conveyor thereby small space between the antenna inductances 5 and 9, no energy is transferred directly from one inductance to the other. Transmission of electrical energy from the transmitter 3 to the receiver 7 occurs only then, when 2 covers both inductances 5 and 9 when travelling in the direction of the arrow 11.

FIGS. 4 to 8 show different possibilities of the arrangement for the loops as well as the transmitters and receivers with respect to the conveyor band.

In accordance with the arrangement of FIG. 4, a plurality of monitoring loops 2 are arranged on the conveyor band 1 which may, for example, be 1 meter wide. The loops may extend approximately from 30 to 50 cm. along the longitudinal direction of the conveyor band, and extend for only a portion of the entire width of the band. An auxiliary slide 2a is associated with every monitoring slide 2, and is situated in proximity of the edge 15 of the band. This auxiliary slide 2a also extends for 30 to 50 cm. in length along the longitudinal direction of the conveyor band. The arrangement and dimensioning of the monitoring slides 2 and the corresponding auxiliary loop 2a is such that the loops 2 and 2a do not overlap, when viewed along the longitudinal direction of the band, as also evident from FIG. 5.

A transmitter 3 with exterior antenna circuit 4 transmits its energy to loops 2 and 2a. The receiver 7 which has an exterior antenna circuit 8 similar to that of the transmitter 3, receives the energy of the transmitter as soon as the loop 2 passes between transmitter and receiver. In similar manner the receiver 7a receives transmitter energy from the transmitter through the auxiliary slide 2a and the exterior antenna circuit 8a of this receiver 7a. If the conveyor band is advanced or moved in the direction of the arrow 11, signals appear at the receives 7 and 7a as a result of the passing of the loops. The signals from the receivers 7 and 7a are applied to a comparator 27 which, in turn, applies its output to a switching unit 28 which will stop motion of the conveyor band when a difference appears between the signals from the receivers 7 and 7a. Such difference in the signals of the receivers may result from the destruction of one of the two slides.

FIG. 5 shows a further embodiment of the present invention, in which auxiliary slides 2a are alternatingly arranged at the oppositely lying edges 15 and 16 of the conveyor band. In this arrangement, the high frequency transmitter and receiver must consist of two transmitters 3 and 3a with antenna circuits 4 and 4a, respectively, whereas the receiver has two units 7 and 7a with antenna circuits 8 and 8a, respectively.

Figure 6:
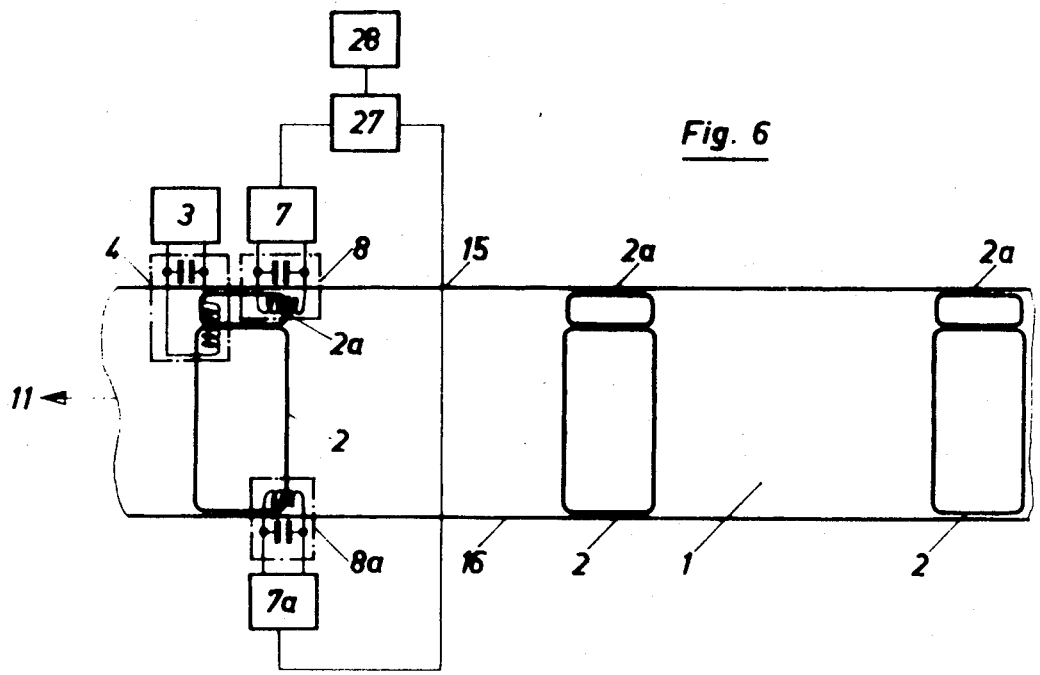
FIG. 6 is a functional schematic diagram and shows a further modification of the embodiment of FIG. 4.

FIG. 6 shows an embodiment of the present invention in which the auxiliary loop 2a is arranged next to the monitoring loop 2.

Figure 7:
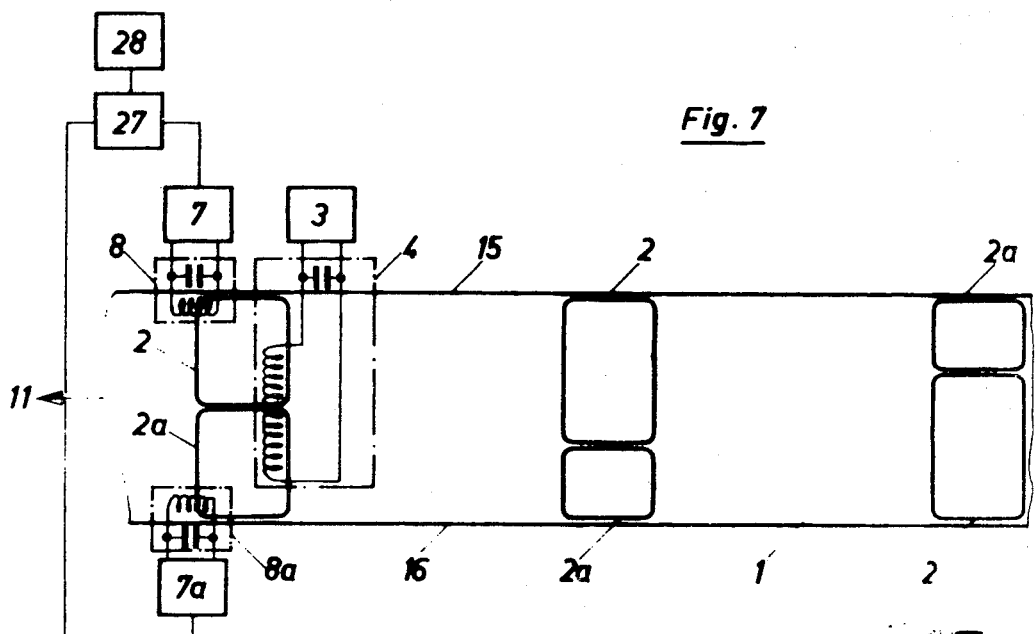
FIG. 7 is a functional schematic diagram and shows an alternate form of the embodiment of FIG. 6.

In accordance with the design of FIG. 7, the monitoring loops 2 and the auxiliary loops 2a are alternatingly arranged with respect to the edges 15 and 16 of the conveyor band. The loop in FIG. 7, moreover, may be made of equal size and may also be driven through one common transmitter. Thus, the loops 2 and 2a, in such arrangement, are of equal dimensions. Instead of one common transmitter, each loop may be monitored through one transmitter and its own receiver, as shown in FIGS. 3 and 3a.

Figure 8:
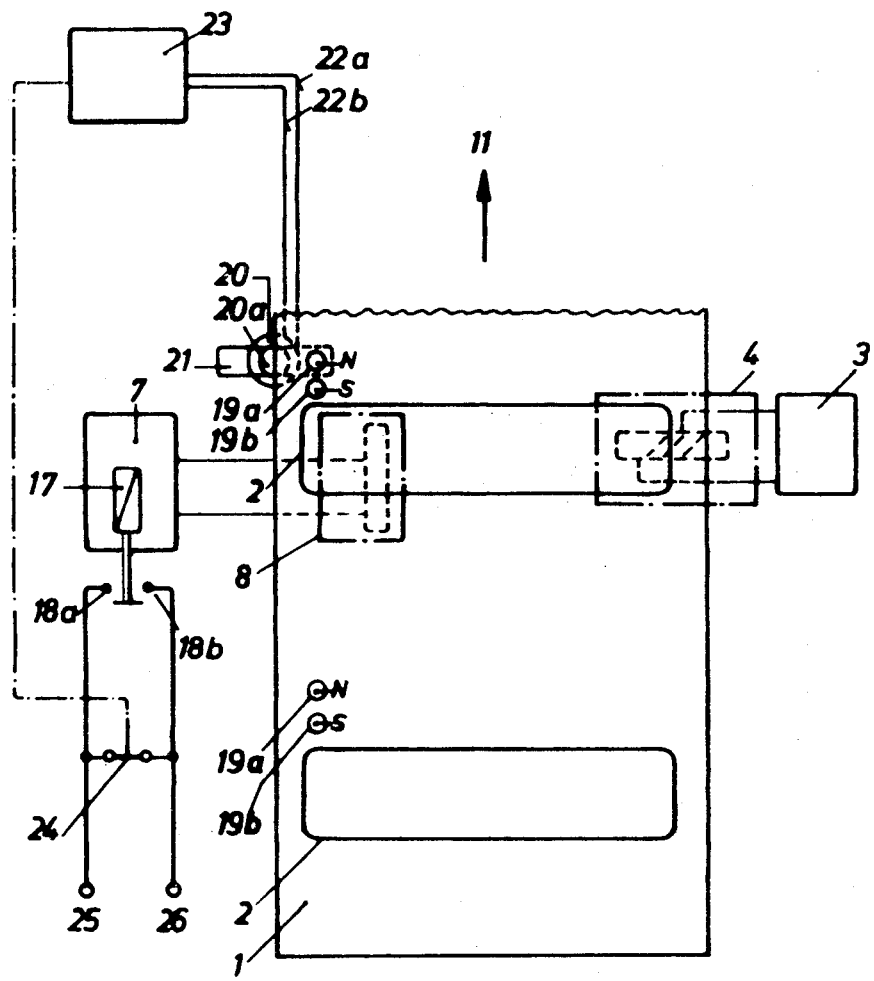
FIG. 8 is a function schematic diagram and shows a still further modification of the arrangement of the monitoring apparatus, in accordance with the present invention.

FIG. 8 shows an embodiment which is particularly adapted for detecting double slit errors.

Monitoring loops 2 are embedded in the conveyor band 1 for monitoring thereof, and these loops 2 cover the entire conveyor band width. A transmitter 3 with associated antenna circuit 4 is coupled, through these loops with a receiver 7 with its associated antenna circuit 8. The coupling between transmitter and receiver is an electromagnetic coupling. A relay 17 with switching contacts 18a and 18b is contained within the receiver 7. These contacts close and open when the conveyor band passes by the exteriorly located antenna circuits which are stationary. Thus, as a result of the monitoring loops 2 embedded within the conveyor band 1 and spaced uniformly more or less, these switching contacts 18a and 18b become closed through a circuit closure as the conveyor band is advanced with these loops passing the stationary antenna circuits. A plurality of small permanent magnets 19a and 19b are arranged on the conveyor band 1 for the purpose of not requiring that the monitoring loops 2 be precisely spaced on the conveyor band. These small permanent magnets are situated in the proximity of each monitoring loop. The permanent magnets operate on a coil 20 which is located outside of the conveyor band and is spaced approximately 50 mm. in front of the magnets which are on the conveyor band. The coil 20 has a ferromagnetic core 20a which is extended through a pole portion 21 directed transverse to the motion of the conveyor band and extending for approximately 20 cm. As a result of the passage or motion of the magnets 19a and 19b past the coil 20, an inducted voltage appears at the terminal connections 22a and 22b. The polarity of this induced voltage is determined by the direction of the magnetic fields of the permanent magnets 19a and 19b.

The induced pulses become analyzed within an analyzing unit 23 with respect to polarity and number, and they affect a circuit contact 24 so that when the magnets 19a and 19b on the conveyor band 1 pass by, the contact 24 is open. Through the oppositely operating contacts 18a and 18b on one hand, and the switching contact 24 on the other hand, the contacts 18a and 18b form a circuit closure when the monitoring slides or monitoring loops 2 are intact. This is before the contact 24 becomes opened through the effect of the magnets or permanent magnets 19a and 19b upon the analyzing circuit 23. Through this circuit action, the control circuit for protecting the applicable or associated motor for the conveyor band, is prevented from being interrupted. Accordingly, a continuous current flow is made available from the circuit terminals 25 and 26.

When a rip prevails in the conveyor band so that the rip extends through the monitoring loop 2, transmission does not take place between the transmitter 3 and receiver 7, and the contacts 18a and 18b become thereby not closed. As a result, the contact 24 becomes opened through the action of the analyzing circuit 23. With the opening of the circuit contact 24, in this manner, the control circuit through the terminals 25 and 26 becomes interrupted and the motor for the conveyor band becomes stopped in its motion. The damaged conveyor band is, consequently, held stationary thereafter. Thus, the monitoring loops 2 made of conductive substance may be conductive segments mounted onto the conveyor band or embedded therein with an exposed surface, as desired. The monitoring loops 2 are shaped in the form of bands, as required, to extend across or along the conveyor band.

It will be understood that each of the elements described above, or two or more together, may also find a useful application in other types of conveyor band arrangements differing from the types described above.

While the invention has been illustrated and described as embodied in a conveyor band arrangement, it is not intended to be limited to the details shown, since various modifications and structural changes may be made without departing in any way from the spirit of the present invention.

What is claimed as new and desired to be protected by Letters Patent is set forth in the appended claims.

We claim:

1. A monitoring arrangement for conveyor bands comprising, in combination, a conveyor band moving along a predetermined path with predetermined velocity and having a predetermined width; a plurality of closed conductive loops spaced at substantially constant intervals along said conveyor band, covering substantially the entire width of said band and mounted for movement with said conveyor band in such a manner that damage to said band within a predetermined region of said band causes damage in said loop, each of said loops having a first and second segment; high frequency transmitter means located in a transmitter location outside of said conveyor band for furnishing a transmitter signal to said first segments of said loops when said loops pass said transmitter location; high frequency receiver means operatively associated with said second segments for receiving said transmitter signals when undamaged loops pass said transmitter location, said receiver means furnishing receiver signals in response to received transmitter signals; and signal analyzing means connected to said receiver means for furnishing a failure signal in the absence of at least one of said receiver signals.

2. The monitoring arrangement as set forth in claim 1, wherein each of said loops has a T-shaped portion in the proximity of each of said conveyor band.

3. A monitoring arrangement for conveyor bands comprising, in combination, a conveyor band moving along a predetermined path with predetermined velocity; a plurality of closed conductive loops mounted for movement with said conveyor band in such a manner that damage to said band within a predetermined region of said band causes damage in said loop, each of said loops having a first and second segment; a plurality of auxiliary loops, each in proximity to one of said closed conductive loops, each extending for less than half of said conveyor band width; high frequency transmitter means located in a transmitter location outside of said conveyor band for furnishing a transmitter signal to said first segments of said loops when said loops pass said transmitter location; high frequency receiver means operatively associated with said second segments for receiving said transmitter signals when undamaged loops pass said transmitter location, said receiver means furnishing receiver signals in response to received transmitter signals; auxiliary high frequency receiver means operatively associated with said auxiliary loops; and signal analyzing means connected to said receiver means for furnishing a failure signal in the absence of at least one of said receiver signals.

4. The monitoring arrangement as set forth in claim 3, further comprising auxiliary high frequency transmitter means operatively associated with said auxiliary loops.

5. The monitoring arrangement for conveyor bands as defined in claim 4 wherein said auxiliary loop means is alternatingly arranged at both edges of said conveyor band.

6. A monitoring arrangement for conveyor bands comprising, in combination, a conveyor band moving along a predetermined path with predetermined velocity; a plurality of closed conductive loops mounted for movement with said conveyor band in such a manner that damage to said band within a predetermined region of said band causes damage in said loop, each of said loops having a first and second segment; a plurality of switch initiating means mounted for movement with said conveyor band, each at a predetermined distance from one of said closed conductive loops in the direction of motion of said conveyor band; switching means responsive to said switch initiating means, mounted outside of said conveyor band; high frequency transmitter means located in a transmitter location outside of said conveyor band for furnishing a transmitter signal to said first segments of said loops when said loops pass said transmitter location; high frequency receiver means operatively associated with said second segments for receiving said transmitter signals when undamaged loops pass said transmitter location, said receiver means furnishing receiver signals in response to received transmitter signals; and signal analyzing means connected to said receiver means for furnishing a failure signal in the absence of at least one of said receiver signals.

7. The monitoring arrangement for conveyor bands as defined in claim 6 wherein said switch initiating means comprises permanent magnet means, said switching means outside of said conveyor band being magnetic switch means.

8. The monitoring arrangement for conveyor bands as defined in claim 6 wherein said switch initiating means comprises a plurality of permanent magnets of different polarity in proximity of a conveyor band edge, said switching means outside of said conveyor band being a polarity dependent switching element having a coil with a predetermined number of turns and a ferromagnetic core with a pole arranged perpendicular to the direction of motion of said conveyor band.

9. The monitoring arrangement for conveyor bands as defined in claim 8 wherein said switching means outside of said conveyor band comprises a Hall generator.

* * * * *